United States Patent [19]

Fuhs

[11] Patent Number: 4,613,439
[45] Date of Patent: Sep. 23, 1986

[54] STRAINER

[76] Inventor: James G. Fuhs, P.O. Box 6134, Modesto, Calif. 95355

[21] Appl. No.: 708,563

[22] Filed: Mar. 6, 1985

[51] Int. Cl.⁴ .............................................. B01D 23/02
[52] U.S. Cl. .................................... 210/471; 210/474
[58] Field of Search ............... 210/464, 465, 474, 475, 210/470, 471, 478, 479, 477, 473

[56] References Cited

U.S. PATENT DOCUMENTS

| | | | |
|---|---|---|---|
| 1,396,416 | 11/1921 | Garrett | 210/477 |
| 1,398,787 | 11/1921 | McLean | 210/474 |
| 2,119,640 | 6/1938 | Lundell | 210/473 |
| 2,331,234 | 10/1943 | Rush | 210/478 |
| 3,392,845 | 7/1968 | Shapiro et al. | 210/470 |
| 4,025,435 | 5/1977 | Shea | 210/250 |
| 4,066,557 | 1/1978 | Banoczi | 210/470 |

Primary Examiner—John Adee
Attorney, Agent, or Firm—Mark C. Jacobs

[57] ABSTRACT

A strainer mountable upon a 55 gallon drum or the like, for thawing frozen edibles comprising a vessel having side walls, preferably a pair of sloping bases extending out from a central opening, which opening is covered by a removable perforated lid. The central opening is surrounded by an upstanding wall to aid in confinement and delivery of the thawed fluid to the drum or barrel.

12 Claims, 8 Drawing Figures

STRAINER

FIELD OF THE INVENTION

The invention herein pertains to a utensil for use by meatcutters and other supermarket employees for defrosting and/or draining of fluids such as water, and blood from foods previously shipped in a frozen state to the store.

BACKGROUND OF INVENTION

Over the years the product mix at both the meat and fish departments of the local supermarket as well as at the local butcher shop have changed. Whereas formerly all meat, poultry and fish were fresh, today many products arrive in a frozen state to be thawed by the vendor for sale to the ultimate consumer. Such products include whole chickens, slabs of beef liver, and shrimps among others. There is a need therefor for an easy to use and sanitary means for defrosting such frozen commodities and to permit the disposal of the large amounts of water associated therewith. Such a device should also not tie up the use of the sink, which is often needed for washing and cleaning of tools, the hands and other devices.

While many strainers have been developed for certain needs and uses, none of them does the job of the instant device. The prior art known to applicant includes the following U.S. Pat. Nos.:

0,431,943, Gaugh;
0,893,840, Taggart;
1,191,994, Plerson;
1,669,284, Chetham;
1,853,808, Greenwood;
2,698,450, Mack;
2,671,239, Wisner;
3,392,845, Shapiro;
3,742,965, Hudzlak;
4,025,435, Shea;
4,041,964, Shamoon;
4,066,557, Bonoczi.

Of these patents, Banoczi is for a paint strainer; Shapiro is for skimming; and Shamoon is primarily for use as a cutting board. The remaining patents are for other purposes. None of the references found in applicant's search of the prior art are for the purpose of the instant device.

It is an object therefore of this invention to provide a device for the defrosting of frozen commodities at a supermarket.

It is another object of this invention to provide a device which can mount on a large trash barrel for direct disposal of waste water.

It is yet another object to provide a can strainer with a removable central section to permit easy disposition of solid waste.

Still another object is to provide a lightweight easy to store utensil for use in supermarkets.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings, wherein like numbers refer to like parts.

SUMMARY OF THE INVENTION

A strainer for mounting on a waste disposal barrel for the defrosting of frozen foodstuffs, and the draining of fluids from foodstuffs. The structure has sidewalls, inclined rest surfaces leading to, a throat area for communication with an open barrel, said throat area covered by a removable perforated drainboard, said drainboard being disposed upon an inward extending lip.

DESCRIPTION OF THE PREFERRED EMBODIMENT

Figure 1:
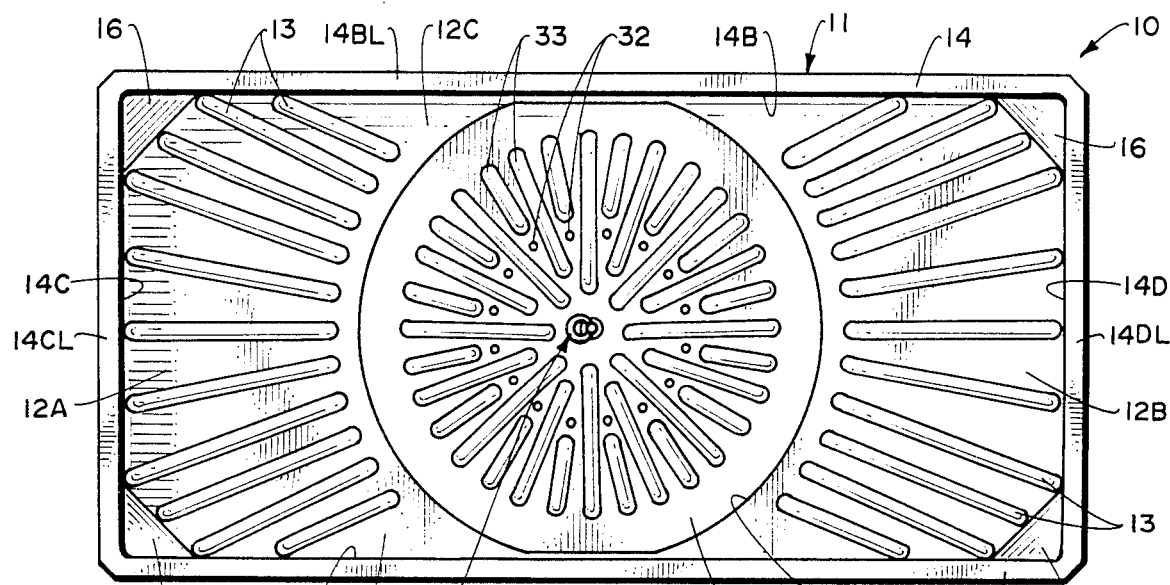
FIG. 1 is a top plan view of the first embodiment of this invention.
Figure 3:
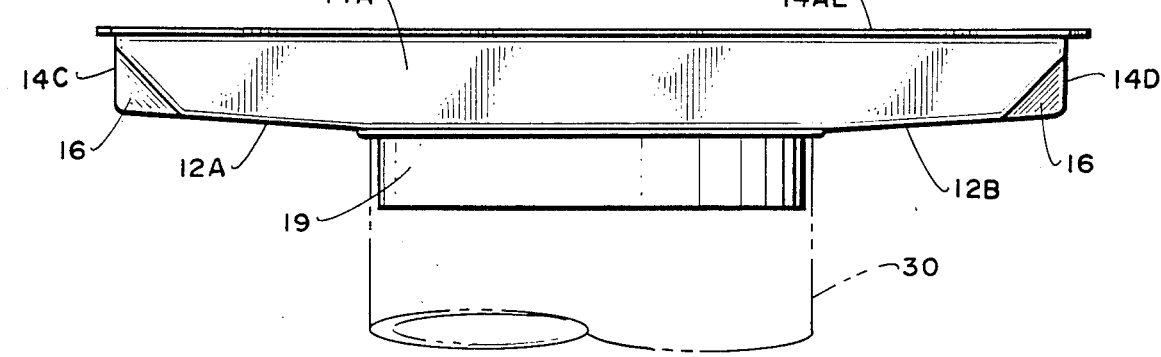
FIG. 3 is a side elevational view of the embodiment of FIG. 1.
Figure 4:
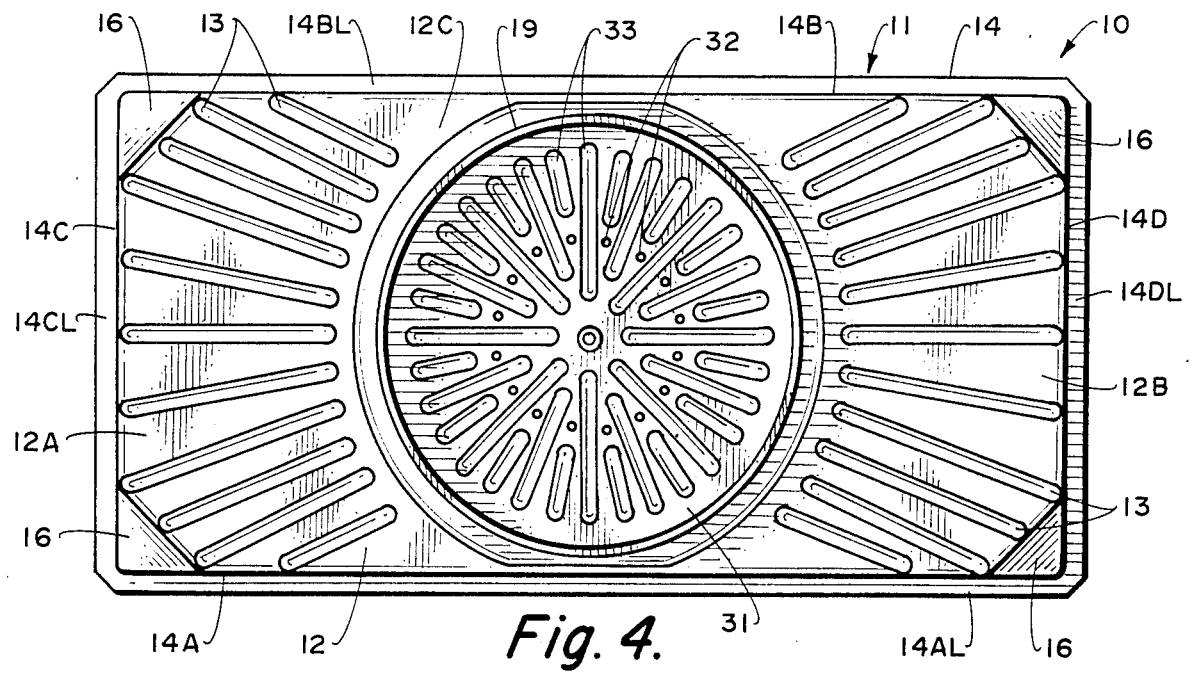
FIG. 4 is a bottom plan view of FIG. 1.

In FIG. 1 device 10 is shown as a vessel 11, open at the top, and having a bottom wall 12, a pair of spaced sidewalls 14C and 14D, a front wall 14A and a rear wall 14B spaced from said front wall. All of said front rear and side walls are connected upstanding in a generally normal direction away from said bottom wall 12. Each of said upstanding walls may include an outwardly directed lip segment, which lip segments designated 14AL, 14BL, 14CL and 14DL preferably form one continuous circumscribing lip such as seen in FIG. 1 and FIG. 3.

Figure 2:
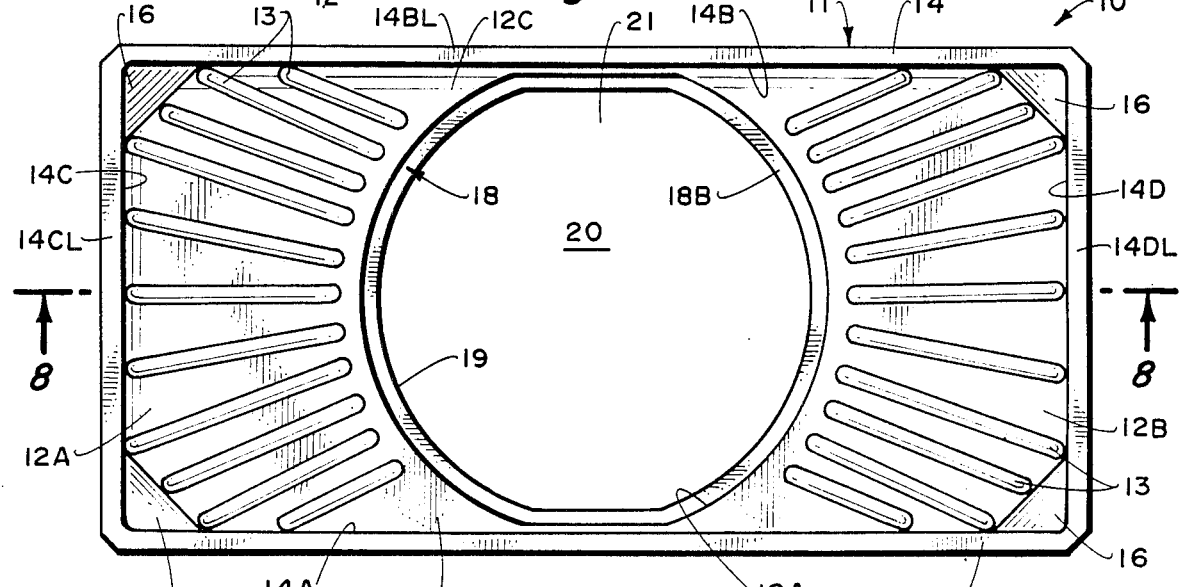
FIG. 2 is a view similar to FIG. 1 but with a portion of the invention removed.

Bottom wall 12 extends the full length of the vessel 11 and includes a left section designated 12A and a right section 12B both of which slope oppositely toward a central opening 20. Bottom wall 12 also includes a flat zone comprised of a pair of generally flat sections 12C which interconnect 12A and 12B both in front of and to the rear of the opening 20. See FIG. 2.

Figure 8:
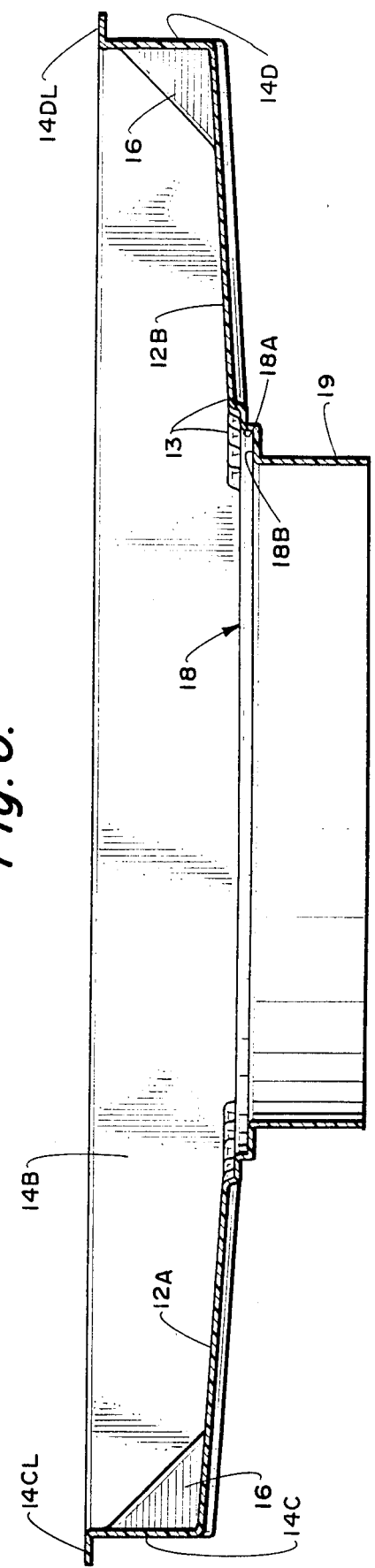
FIG. 8 is a closeup sectional view of the device of FIG. 3.

Moving to the closeup sectional view of FIG. 8 it is seen that the walls 12A and 12B terminate in a steplike rim 18 formed of a circular downwardly depending riser 18A and a horizontal inwardly depending ledge 18B. Rim 18 surrounds opening 20 and communicates with and abuts uptanding can mount wall 19, which is adapted to fit within a standard 55 gallon drum 30 or other waste container as shown in FIG. 3. Mount 19 has a central hole 21.

Disposed on the upper surface of bottom wall sections 12A and 12B are a plurality of centrally radiating ridges 13 directed toward opening 20. Opening 20 and central hole 21 are preferably sized the same in diameter to avoid any constriction in flow to the can 30.

Figure 5:
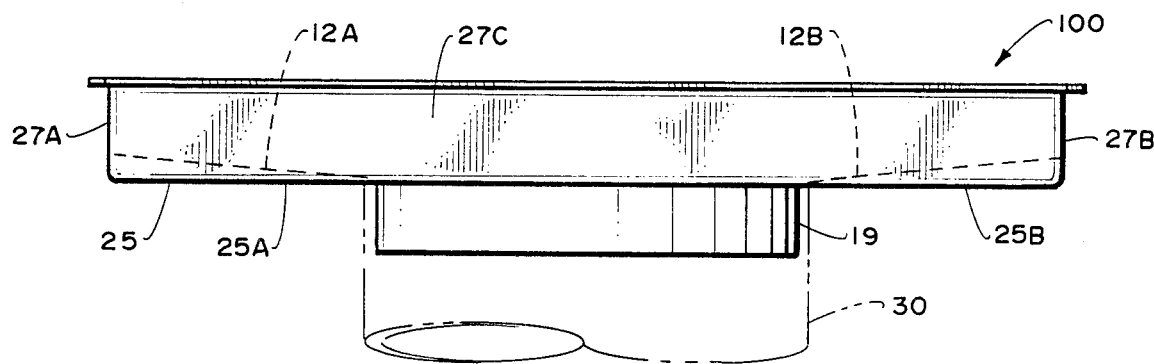
FIG. 5 is a front elevational view illustrating a variant in the construction for a version similar to in appearance and functionally equivalent to the first embodiment.

Optionally as seen in FIG. 5, device 100 includes a flat bottom wall section 25 on each side of upstanding wall 19, and designated 25A and 25B. These are connected by risers 27 A, B C and D of which A and B are shown in FIG. 5, to the existing walls 14 A, B, C and D. Since the addition of this extra false bottom adds materially to the cost, it is the less preferred embodiment of the instant device. Note also the absence of the circumscribing lip in this embodiment.

Opening 20 is covered by a removable flat cover 31 that includes a plurality of ridges 33 similar to those designated 13 on the upper surface of bottom wall 12. These top mounted ridges area adapted to receive and support food in a frozen state in the same manner as ridges 13. These ridges 33 radiate outwardly 360 degrees from the center of the cover.

Figure 6:
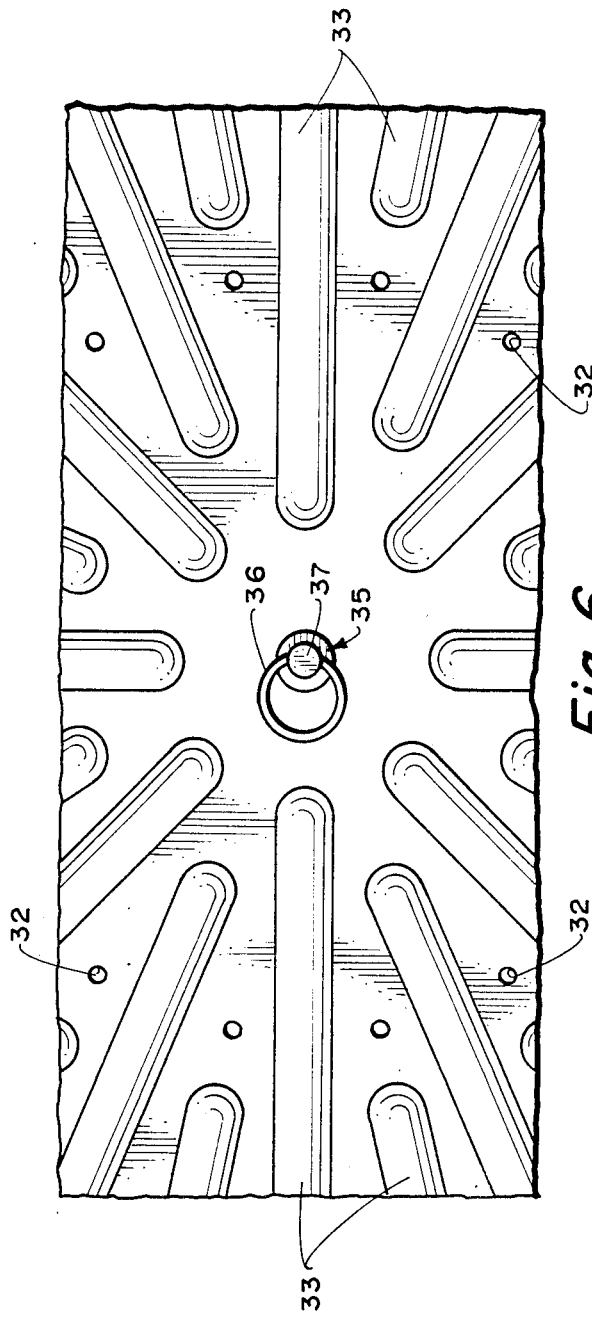
FIG. 6 is a closeup plan view of a portion of the cover

Cover 31 is sized in cross section to rest upon circular ledge 18B within the confines of riser 18A. Cover 31 also includes a pivoting handle 35 centrally or edgewise disposed which comprises a hand grasp 36 seen in FIG. 6 and a handle mount 37 adapted to receive the hand grasp 36. Cover 31 also includes a plurality of about $\frac{1}{2}''$ perforatings 32 for the draining of undesired liquids such as water and blood. The perforations are preferably in a circular configuration.

Optional reinforcing corners 16 can be employed at the interface of the sidewalls 14C and D with the aforementioned front and rear walls.

All parts of the instant device are to be made of food grade plastic, except perhaps the hand grasp 36. Typically polystyrene may be employed as can a copolymer of acrylonitile-butadiene-styrene (ABS).

The weight of the instant device is low enough to permit complete portability, i.e. it can be moved by one worker from storage to a work position.

It can be used for the defrosting of frozen shrimp, liver, fish and other bulk meats whereby the fluid will drain to the disposal can 30 through perforation 32. Once the defrosting process is over, the device may be washed and wall hung as is known in the supermarket business.

Figure 7:
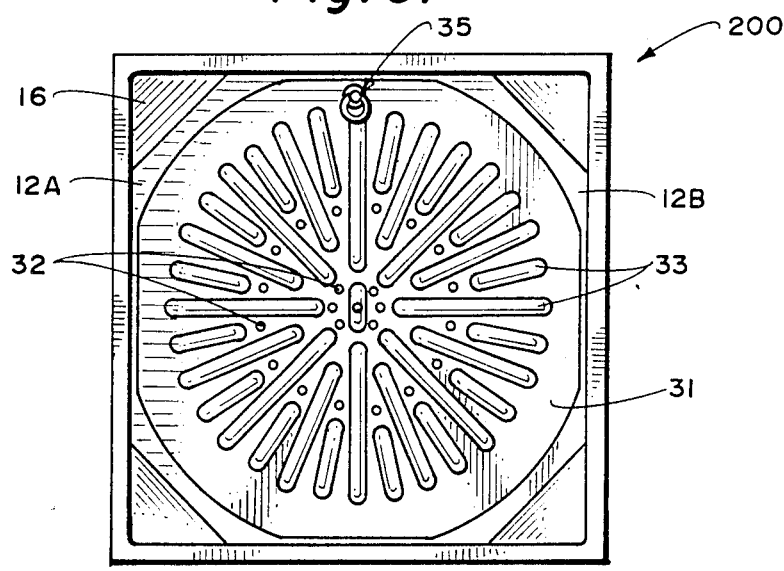
FIG. 7 is a top plan view of the second embodiment of the invention.

A variant designated 200 as seen in FIG. 7 includes a very small section of bottom walls 12 A and 12B. As seen in FIG. 7 these bottom wall sections lack the ridges of devices 10 & 100. The cover 31 comprises substantially all of the floor of the device. The balance of device 200 is substantially similar to device 10, except that as shown the handle 35 is mounted on the side of the lid. Also, a second circle of perforations 32 may be included to help drain away waste fluids.

Since the balance of device 200 resembles device 10 further discussion need not be had of like parts.

In a typical construction of the devices 10 or 100 the dimensions of the walls are about 44" long by 20 wide. The cover plate is about 20½" in diameter while the side walls are 4-6" high. The central opening is preferably of a circular configuration. Such a unit would be utilized on a 32 gallon drum.

Optionally, though not shown in the drawings, suitable hanging means such as an eye disposed in the corner may be employed to hang the instant device on a wall mounted hook. Such hook and eye means are known to the art.

Since certain changes may be made in the above apparatus without departing from the scope of the invention involved herein, it is intended that all matter contained in the above description and shown in the accompanying drawings shall be interpreted as illustrative and not in a limiting sense.

I claim:

1. A strainer for the defrosting of frozen food commodities which is adapted to be mounted on a 55 gallon drum or the like, comprising:
   a vessel having spaced upstanding sidewalls and spaced upstanding front and rear walls,
   a central flat zone having a central opening therein, said flat zone connected to said front and rear walls at the bottom edge thereof,
   a can mount wall surrounding said central opening and depending vertically downwardly, said can mount wall sized to fit within a disposal drum, and
   a removable lid covering said central opening, said lid having a plurality of perforations therein, said perforations occupying only a portion of the surface area of the lid.

2. The device of claim 1 including an outwardly directed circumscribing lip on the edge of said side, front and rear walls distant from the bottom wall.

3. The device of claim 1 including a bottom wall having a pair of oppositely sloping side sections.

4. The device of claim 1 wherein said cover include a handle means comprising a handle mount and as hand grip.

5. The device of claim 1 wherein the corners are reinforced.

6. The device of claim 1 wherein both the lid and bottom wall side sections have raised ridges.

7. The device of claim 6 including a false flat bottom disposed beneath said bottom wall.

8. A strainer for the defrosting of frozen food commodities which is adapted to be mounted on a 55 gallon drum or the like, comprising:
   a vessel having spaced upstanding sidewalls and spaced upstanding front and rear walls,
   a central flat zone having a central opening therein, said flat zone connected to said front and rear walls at the bottom edge thereof, by a bottom wall having a pair of oppositely sloping side sections,
   a can mount wall surrounding said central opening and depending vertically downwardly, said can mount wall sized to fit within a disposal drum, and
   a removable lid covering said central opening said lid having a plurality of perforations therein, said perforations occupying only a portion of the surface area of the lid.

9. The device of claim 8 wherein said side sections of the bottom wall include raised ridges directed toward the central opening.

10. The device of claim 9 wherein the lid also includes a plurality of raised ridges.

11. The device of claim 8 wherein the perforations of the lid are set out in a ring, and a handle for said lid is mounted thereon.

12. The device of claim 11 including a circumscribing upper lip outwardly directed at the edge of said front and rear and sidewalls away from the bottom wall.

* * * * *